United States Patent
Rechdan et al.

(10) Patent No.: US 9,088,228 B2
(45) Date of Patent: Jul. 21, 2015

(54) SIGNALING METHOD AND DEVICE FOR IMPAIRED FUNCTION OF AN ELECTRONIC POWER SYSTEM IN A MULTIPLE-PHASE ALTERNATOR

(75) Inventors: Raymond Rechdan, Villecresnes (FR); Jean-Marie Pierret, Paris (FR); Christophe Louise, Alfortville (FR)

(73) Assignee: Valeo Equipements Electriques Moteur, Créteil Cedex (FR)

( * ) Notice: Subject to any disclaimer, the term of this patent is extended or adjusted under 35 U.S.C. 154(b) by 1552 days.

(21) Appl. No.: 12/513,001

(22) PCT Filed: Nov. 20, 2007
(Under 37 CFR 1.47)

(86) PCT No.: PCT/FR2007/052371
§ 371 (c)(1),
(2), (4) Date: Nov. 23, 2011

(87) PCT Pub. No.: WO2008/068437
PCT Pub. Date: Jun. 12, 2008

(65) Prior Publication Data
US 2012/0098670 A1      Apr. 26, 2012

(30) Foreign Application Priority Data
Dec. 4, 2006  (FR) ...................................... 06 55302

(51) Int. Cl.
*G08B 21/00*    (2006.01)
*H02P 9/00*     (2006.01)
*H02M 7/00*     (2006.01)

(52) U.S. Cl.
CPC *H02P 9/006* (2013.01); *H02M 7/00* (2013.01)

(58) Field of Classification Search
USPC .............. 340/660, 657, 661–663, 425.5, 438, 340/455, 635, 653; 363/13, 145, 74
See application file for complete search history.

(56) References Cited

U.S. PATENT DOCUMENTS 3,210,727 A * 10/1965 McLaughlin et al. ........ 340/455
5,127,085 A    6/1992  Becker et al.
(Continued)

FOREIGN PATENT DOCUMENTS

EP        0 571 657 A2    9/1992
FR        2 678 952 A     1/1993
WO    WO 2006/095497 A    9/2006

*Primary Examiner* — Steven Lim
*Assistant Examiner* — Ryan Sherwin
(74) *Attorney, Agent, or Firm* — Berenato & White, LLC

(57) ABSTRACT

The signalling method is implemented in an electronic power system (6) of a multiple-phase alternator. The system (6) is of the type comprising a set of rectifiers (5) capable of rectifying the voltage of phases (Ph1, Ph2, Ph3, Ph4, Ph5, Ph6) produced by the alternator, and a control assembly (2, 3) capable of controlling an excitation current from the alternator, of monitoring the conformity of at least one current characteristic of at least one (Ph) of the voltage of phases (Ph1, Ph2, Ph3, Ph4, Ph5, Ph6) in relation to a nominal characteristic, and of signalling any non conformity. In accordance to the method of the invention, the non conformity of at least one current characteristic of at least one (Ph) of the voltage of phases (Ph1, Ph2, Ph3, Ph4, Ph5, Ph6) is simulated in case of impaired function of at least one of the rectifiers (5). The invention thus permits the use of signalling means provided in an existing regulator to signal additional impaired functions which were not initially processed by the signalling means.

9 Claims, 3 Drawing Sheets

(56) References Cited

U.S. PATENT DOCUMENTS

| | | | | |
|---|---|---|---|---|
| 5,646,599 A * | 7/1997 | Adachi | ........................ | 340/648 |
| 5,703,478 A * | 12/1997 | Main | ............................ | 323/315 |
| 5,773,964 A * | 6/1998 | Peter | ............................ | 322/20 |
| 6,111,768 A * | 8/2000 | Curtiss | ........................... | 363/98 |
| 6,239,996 B1 * | 5/2001 | Perreault et al. | ................. | 363/89 |
| 6,541,943 B1 * | 4/2003 | Wylie et al. | ...................... | 322/28 |
| 7,292,445 B2 * | 11/2007 | Linke | ............................. | 361/715 |
| 7,541,758 B2 * | 6/2009 | Inaba et al. | ................... | 318/140 |
| 7,834,578 B2 * | 11/2010 | Sato | ............................. | 318/800 |
| 2005/0017694 A1* | 1/2005 | Masson et al. | ................. | 322/19 |
| 2005/0226298 A1* | 10/2005 | Asai | ............................. | 372/50.1 |

* cited by examiner

SIGNALING METHOD AND DEVICE FOR IMPAIRED FUNCTION OF AN ELECTRONIC POWER SYSTEM IN A MULTIPLE-PHASE ALTERNATOR

CROSS-REFERENCE TO RELATED APPLICATIONS AND CLAIM TO PRIORITY

This application relates to International Application No. PCT/FR2007/052371 filed Nov. 20, 2007 and French Patent Application No. 0655302 filed Dec. 4, 2006, of which the disclosures are incorporated herein by reference and to which priority is claimed.

TECHNICAL FIELD OF THE INVENTION

The present invention concerns a method and a device for signalling anomalous operation of an electronic power system of a multiple-phase alternator. The invention also concerns the multiple-phase alternator including this signalling device.

TECHNOLOGICAL BACKGROUND OF THE INVENTION

For obvious safety reasons, the important equipment of an automobile vehicle is provided with devices for detecting and signalling any anomalous operation.

The onboard generator, generally consisting of an alternator the phase voltages of which are rectified, is one such important equipment and all drivers know the location of the red "charging" indicator on the dashboard of their car.

The general use of vehicle onboard electronics, often substituted for electromechanical elements, provides ever more refined detection of malfunctions and circumstances conducive to breakdowns, for diagnostic or signalling purposes.

For example, the electronic voltage regulator described in U.S. Pat. No. 5,646,599 detects not only an anomalous battery charging voltage but also a fault affecting any of the alternator phase voltages and the duty cycle of the excitation current failing to conform to ranges of nominal values depending on the mode of operation of the alternator.

However, development of electronic systems also increases their complexity, which generates new requirements for detecting and signalling breakdowns.

Thus the electrical power supply unit described in U.S. Pat. No. 5,646,599 uses diode bridges as rectifiers. These components are considered reliable and a fault affecting any of them is detected only indirectly through monitoring the charging voltage.

On the other hand, if to improve efficiency diode bridges are replaced by synchronous rectifiers based on ad hoc control of metal oxide silicon field-effect transistors (MOSFETs), the problem arises of detecting and signalling malfunctions of the transistors and their control circuits.

The problem of detecting a fault can be easily solved at the component level by appropriate design of the component, but there remains the problem of signalling the fault, i.e. of making the driver aware of the anomaly that has been detected, which increases the complexity of the connectors and components and in a correlated way the cost. Moreover, the multiplicity of lamps or other indicators can be a drawback for drivers already swamped by the large amount of information shown on the dashboard of a vehicle.

GENERAL DESCRIPTION OF THE INVENTION

The essential object of the present invention is to eliminate the above drawbacks of the prior art.

The present invention is more precisely concerned with a method of signalling anomalous operation of an electronic power system of a multiple-phase alternator.

The electronic power system concerned is of the type comprising a set of rectifiers adapted to rectify the phase voltages produced by said alternator and a regulator system adapted to control an excitation current of said alternator, to monitor the conformity of at least one standard characteristic of at least one of the phase voltages to a nominal characteristic, and to signal any non-conformity.

The method of the invention is noteworthy in that the non-conformity of at least one standard characteristic of at least one of the phase voltages is simulated in the event of a malfunction of at least one of the rectifiers.

Thus the invention uses signalling means provided in existing regulators to signal further malfunctions not initially processed by those signalling means.

The standard characteristic is preferably an instantaneous value of one of the phase voltages and the nominal characteristic is preferably a nominal voltage.

In the method of the invention, an error voltage is advantageously added to at least one of the phase voltages in the event of a malfunction of at least one of the rectifiers.

Alternatively, at least one of the phase voltages is forced to a non-conforming voltage in the event of a malfunction of at least one of the rectifiers.

The invention also relates to a device for signalling anomalous operation of an electronic power system of multiple-phase alternator adapted to implement the method described above.

The electronic power system concerned is a set of rectifiers of phase voltages produced by the alternator and a regulator system.

The regulator system conventionally includes:
  means for controlling an excitation current of the alternator,
  means for monitoring the conformity of at least one standard characteristic of at least one of the phase voltages to a nominal characteristic, and
  means for indicating any non-conformity.

The device of the invention differs from the known prior art by exploiting the fact that the rectifiers are synchronous rectifiers each including a control circuit including means for simulating any non-conformity of the standard characteristic in the event of a malfunction.

The simulation means preferably include a generator producing an offset voltage in the event of a malfunction.

The offset voltage is advantageously added to at least one of the phase voltages by an adder circuit, preferably an adder circuit using resistors.

It is advantageous that the control circuit includes a diagnostic terminal, preferably two such terminals, to which the offset voltage is applied by the generator, and that a number of these terminals are preferably interconnected.

The invention also consists in a multiple-phase alternator, preferably a six-phase alternator, including a device as described above for signalling anomalous operation of a power electronic system.

These few essential characteristics will have made the advantages of the invention over the prior art clear to the person skilled in the art.

Detailed characteristics of the invention are described in the description given hereinafter with reference to the appended drawings. Note that these drawings are intended only to illustrate the description and do not in any way limit the scope of the invention.

DESCRIPTION OF PREFERRED EMBODIMENTS OF THE INVENTION

Figure 1:
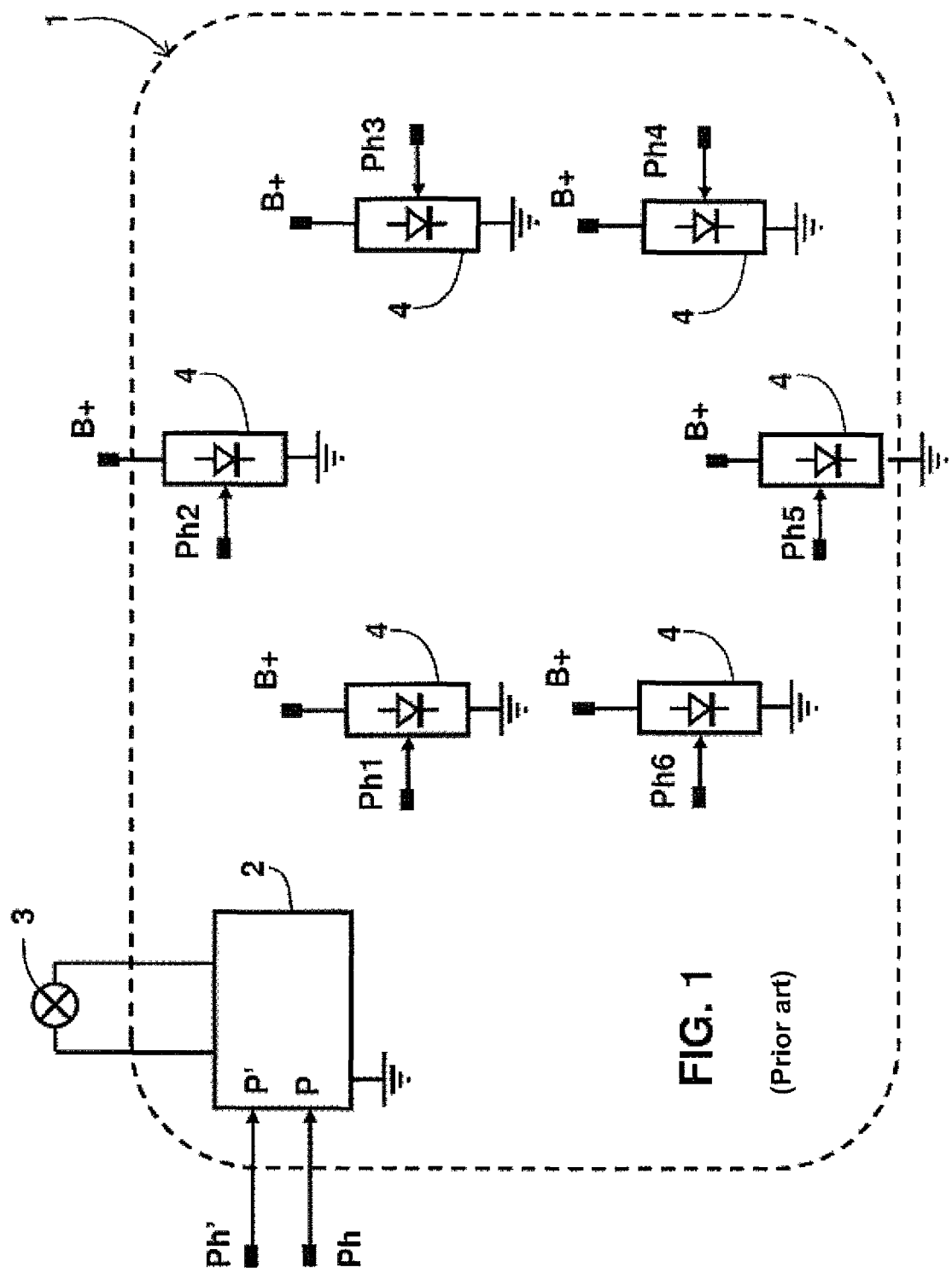
FIG. 1 represents diagrammatically a prior art device for signalling anomalous operation of a power electronic system.

In the current situation of diode bridge alternators, a malfunction of an electronic power system1, such as that represented in FIG. 1, is diagnosed by a regulator 2 of a regulator system 2, 3 which detects an anomaly on two phase voltages Ph, Ph' of the phase voltages Ph1, Ph2, Ph3, Ph4, Ph5, Ph6 applied to its "phase" inputs P, P'.

The detection of an anomaly causes it to be signalled by means of a lamp 3 or, if the regulator 2 is provided with an appropriate interface, by sending a code over the onboard communication network.

This known device detects failure of two of the three bridge arms used to rectify three phase voltages in the case of a three-phase alternator or of two of the six bridge arms 4 used to rectify six phase voltages Ph1, Ph2, Ph3, Ph4, Ph5, Ph6 in the case of a six-phase alternator (this situation is represented in FIG. 1).

This device does not detect a malfunction of the diodes 4, but this limitation is justified by the reliability of the diodes 4 and the proven techniques for using and assembling them.

Figure 2:
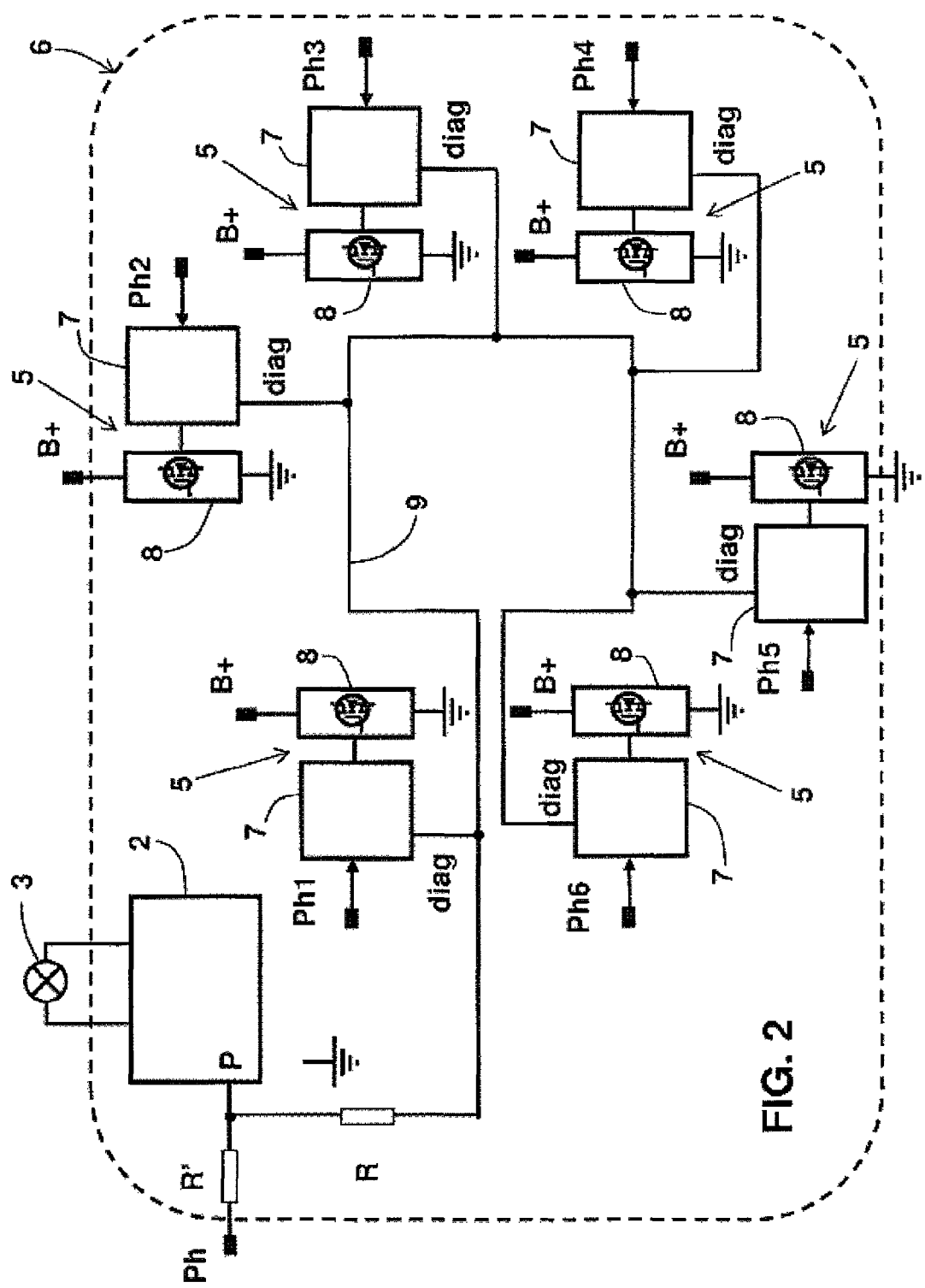
FIG. 2 represents diagrammatically a device of the invention for signalling anomalous operation of a power electronic system.

In the event of replacement of the diode rectifiers 4 by synchronous rectifiers 5, as shown in FIG. 2, it becomes desirable to diagnose any malfunctions of the power electronic 6, notably the MOSFETs 8 and their control circuits 7.

To this end, the control circuits 7 consists of application-specific integrated circuits (ASIC) each of which has a diagnostic output diag at a potential that is preferably between 0 V and 2 V relative to ground in the event of a malfunction.

For practical reasons of wiring and cost, it is clearly not possible to signal each detected fault individually by means of a lamp. Moreover, it is not desirable to create a specific connection to each rectifier, all these connections terminating at the regulator system, as the latter system would then have a large number of inputs (one per connection).

The solution of the invention to this problem is to use a fault detector system that already exists in the regulator 2, based on the phase signal Ph, as shown clearly in FIG. 2.

The different diagnostic outputs diag of the control ASICs 7 are connected in common by a single connection 9 to one end of a first resistor R the other end of which is connected to a "phase" input P of the regulator 2.

A second resistor R' is connected in series between an output Ph of the alternator and the "phase" input P of the regulator 2.

These first and second resistors R, R' constitute a resistor adder circuit which superimposes on the nominal phase voltage Ph a voltage diag between 0 V and 2 V in the event of a fault in one of the synchronous rectifiers 5, thereby creating an anomaly that is detected and signalled by the regulator 2.

As an alternative to this preferred embodiment, in another preferred embodiment, the "phase" input P of the regulator 2 is forced to the voltage at the diagnostic output diag of one of the control circuits 7. In this case the first resistor R is dispensed with.

Figure 3:
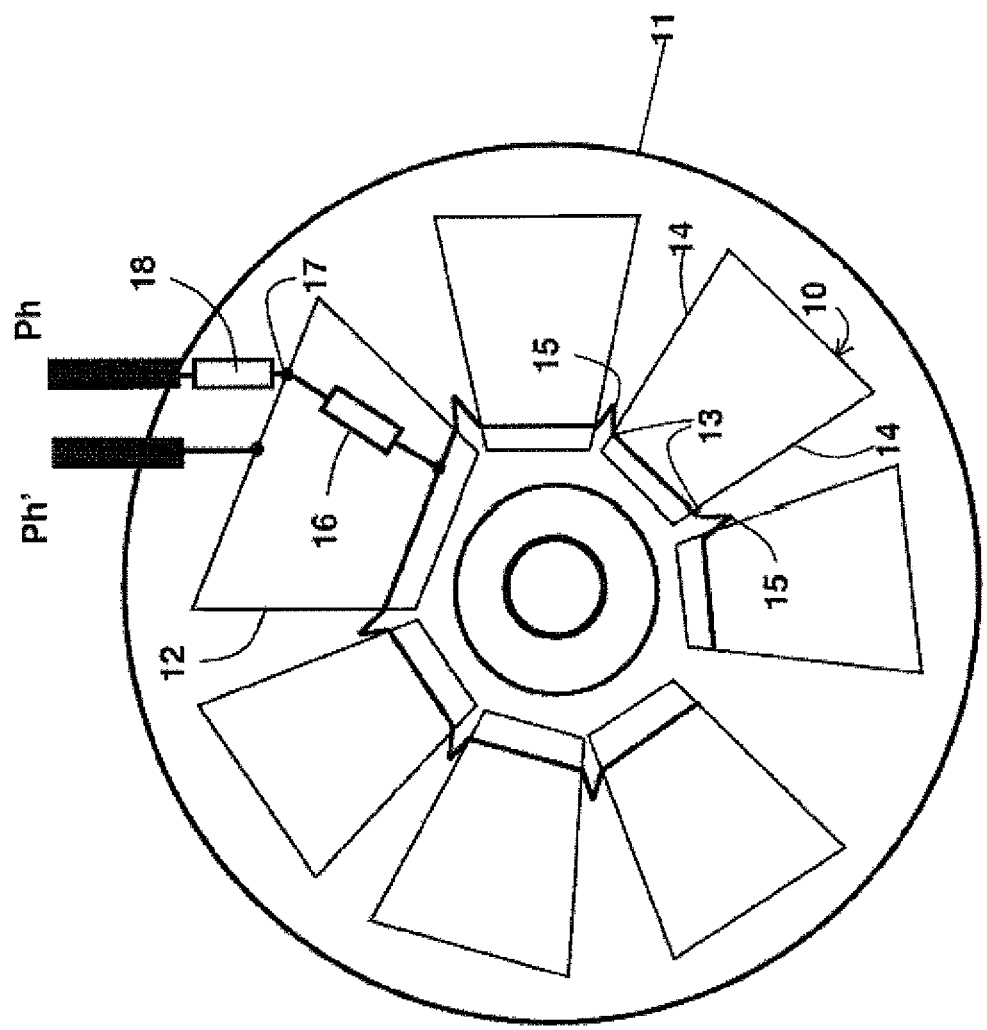
FIG. 3 represents diagrammatically a six-phase alternator comprising a device of the invention for signalling anomalous operation.

FIG. 3 shows one example of fitting to a six-phase alternator an anomalous operation signalling device as described above.

The control circuits 7 of the power transistors 8 take the form of substantially circular-sector-shaped modules 10 distributed over the rear face of the alternator 11.

The casing 12 of the regulator 2 is also substantially circular-sector-shaped.

The synchronous rectifier modules 10 each have two diagnostic terminals 13 on their radial faces 14, which are connected together inside the module 10.

This configuration facilitates interconnection of all the diagnostic terminals 13 during assembly, either by proximity contact 15 or by screws, and also connecting them to a 10 K resistor 16, itself connected by another 10 K resistor 18 to the "phase" terminal 17 of the casing 12 of the regulator 2, which is at a phase voltage Ph that is one of the phase voltages Ph1, Ph2, Ph3, Ph4, Ph5, Ph6.

As goes without saying, the invention is not limited to the preferred embodiments described above.

In particular, a standard characteristic other than the voltage, for example the frequency, can be modified instead to simulate anomalous operation.

The specified type of rectifiers 5, other than diodes 4, type of power semiconductors 8 and number of phases Ph1, Ph2, Ph3, Ph4, Ph5, Ph6 of the alternator are given by way of example only.

The same goes for the specified value of the diagnostic output voltage diag and the specified values of the resistors R, R'.

To the contrary, the invention encompasses all possible variant embodiments within the scope of the following claims.

The invention claimed is:

1. A method of signalling anomalous operation of an electronic power system (6) of a multiple-phase alternator (11), said method comprising:

rectifying phase voltages (Ph1, Ph2, Ph3, Ph4, Ph5, Ph6) produced by said alternator (11) by a set of rectifiers (5) each rectifier comprising a metal-oxide-semiconductor field-effect transistor (MOSFET) and a control circuit coupled to said MOSFET, wherein each control circuit has an output and each output of each control circuit of the set of rectifiers is connected in common to a single connection coupled to a regulator system (2,3);

controlling an excitation current of said alternator (11) by said regulator system (2, 3);

monitoring conformity of a standard characteristic of at least one of said phase voltages (Ph1, Ph2, Ph3, Ph4, Ph5, Ph6) to a nominal phase voltage (Ph) by said regulator system (2, 3), wherein the conformity of the standard characteristic is based on an output of the single connection; and signaling a non-conformity of said standard characteristic of at least one of said phase voltages (Ph1, Ph2, Ph3, Ph4, Ph5, Ph6) when an offset voltage is detected at the output of the single connection, wherein the non-conformity is signaled by a lamp (3) of the regulator system (2,3).

2. The method according to claim 1 wherein said standard characteristic is an instantaneous value of one of said phase voltages (Ph1, Ph2, Ph3, Ph4, Ph5, Ph6).

3. The method according to claim 2, wherein the non-conformity is signaled by adding the offset voltage to the nominal phase voltage (Ph) when the offset voltage is detected at the output of the single connection.

4. The method according to claim 2, wherein the offset voltage is based on a potential voltage output of at least one of the outputs of the control circuits of the set of rectifiers, wherein the potential voltage is in the range of 0V and 2V relative to ground.

5. A system for signalling anomalous operation of an electronic power system (6), said system comprising:
- a plurality of rectifiers (5) coupled to an alternator (11), each rectifier comprising a metal-oxide-semiconductor field-effect transistor (MOSFET) and a control circuit coupled to said MOSFET, wherein each control circuit has an output and each output of each control circuit of the plurality of rectifiers is connected in common to a single connection;
- a regulator (2) coupled to the single connection, wherein the regulator (2) is configured to:
  - control an excitation current of said alternator (11),
  - monitor conformity of a standard characteristic of at least one phase voltage (Ph1, Ph2, Ph3, Ph4, Ph5, Ph6) to a nominal characteristic, wherein the at least one phase voltage (Ph1, Ph2, Ph3, Ph4, Ph5, Ph6) is applied to at least one of the rectifiers (5) by said alternator, and
  - any indicate a non-conformity when an offset voltage is detected at the output of the single connection; and
- a lamp (3) coupled to the regulator (2), wherein the non-conformity is signaled by the lamp (3) when the offset voltage is detected at the output of the single connection.

6. The device according to claim 5, wherein an error voltage is generated when the offset voltage is detected at the output of the single connection.

7. The device according to claim 6, wherein said error voltage is added to at least one of said phase voltages (Ph1, Ph2, Ph3, Ph4, Ph5, Ph6) by an adder circuit using resistors (R, R').

8. The device according to claim 7, wherein the offset voltage is detected at the output of the single connection when at least one of the control circuits of the plurality of rectifiers has experienced a malfunction.

9. A multiple-phase alternator (11), including a device for signalling anomalous operation of an electronic power system (6), said alternator (11) comprising:
- a plurality of rectifier modules (10) coupled to a rear face of the alternator (11), each rectifier module (10) comprising a metal-oxide-semiconductor field-effect transistor (MOSFET) and a control circuit coupled to said MOSFET, wherein each control circuit has an output and each output of each control circuit of the plurality of rectifier modules (10) is connected in common to a single connection; and
- a regulator system (2) coupled to the single connection, wherein the regulator (2) is configured:
  - control an excitation current of said alternator (11) and
  - monitor conformity of a standard characteristic of at least one phase voltage (Ph1, Ph2, Ph3, Ph4, Ph5, Ph6) to a nominal characteristic, wherein the at least one phase voltage (Ph1, Ph2, Ph3, Ph4, Ph5, Ph6) is applied to at least one of the rectifier modules (10) by said alternator (11); and
- a lamp (3) coupled to the regulator (2), wherein a non-conformity is signaled by the lamp (3) when an offset voltage is detected at the output of the single connection.

* * * * *